United States Patent [19]
Siczek

[11] 3,965,927
[45] June 29, 1976

[54] OVERRUN VALVE FOR AIR PUMPS
[75] Inventor: Bernard W. Siczek, La Grange Park, Ill.
[73] Assignee: Graco Inc., Minneapolis, Minn.
[22] Filed: Dec. 2, 1974
[21] Appl. No.: 528,708

[52] U.S. Cl. ............................. 137/460; 137/463
[51] Int. Cl.² ..................................... F16K 17/00
[58] Field of Search ............ 137/459, 460, 463, 461

[56] References Cited
UNITED STATES PATENTS

| | | | |
|---|---|---|---|
| 2,694,408 | 11/1954 | McRae | 137/463 X |
| 3,146,789 | 9/1964 | Curth | 137/461 |

Primary Examiner—Harold W. Weakley
Attorney, Agent, or Firm—Paul L. Sjoquist

[57] ABSTRACT

Apparatus is disclosed for controlling the rate of air flow in a pressurized air line, and for closing a valve when the air flow exceeds a predetermined maximum flow rate. The apparatus comprises a double air chamber with intermediate diaphragm for sensing air flow rate and actuating a latch mechanism, and includes a pressure-dependent latch control mechanism.

5 Claims, 3 Drawing Figures

OVERRUN VALVE FOR AIR PUMPS

BACKGROUND OF THE INVENTION

This invention relates to an apparatus for controlling air flow in a pressurized air line, by sampling the rate of air flow and blocking the line air flow passage whenever the flow rate exceeds a predetermined and selectable maximum. The invention also serves as a safety shut-off valve to block the air line whenever downstream air pressure drops below a minimum predetermined level. The invention is preferably used in conjunction with a system comprising a compressed air source and an air operated reciprocating pump, wherein the reciprocating pump is driven by means of a reciprocating air motor. Such an apparatus has the characteristic that the air motor delivers pumped fluid at a predetermined pressure and reciprocates at a rate required to maintain the predetermined pump fluid pressure. Therefore, whenever the pumped fluid is transferred, the air motor reciprocates only until fluid pressure is developed to the predetermined setting and then it ceases reciprocating. While the pumped fluid is being transferred, the air motor reciprocates at whatever rate is required to maintain the predetermined fluid pressure. Such a system has the disadvantage of causing the air motor to race or run away when the supply of pumped fluid becomes exhausted, or when the pumped fluid line suddenly breaks, thereby dropping fluid pressure to zero. In this case, the air motor reciprocates at an increasing rate to attempt to maintain the desired and predetermined pressure but, because it is impossible to maintain the desired fluid pressure, the air motor may reciprocate so fast that it becomes damaged or destroyed. Therefore, the present invention provides a safety valve to prevent such a runaway condition and to shut down the system whenever this condition occurs.

Prior art safety shut-off devices have been developed for venting or relieving a pressurized line whenever pressure exceeds a predetermined maximum. Prior art devices have also been developed for shutting off a pressurized air line whenever the downstream pressure drops below a predetermined value, as for example when a break occurs in a downstream pressure line. The present invention is an improvement over these prior art devices in that it provides a measure of safety control and shutoff under conditions less serious than an actual break in the pressure line, but which could result in damage or destruction of the air motor under the conditions hereinbefore described.

SUMMARY OF THE INVENTION

Briefly, the invention comprises a valve apparatus insertable in a pressurized air line, and which has a valve for blocking air flow through the line whenever the volumetric rate of air flow exceeds a preselectable maximum. The invention comprises two chambers separated by a diaphragm member, the first chamber being insertable into the pressurized air flow through the line, and the second chamber being in communication with a point downstream of the first chamber. Communication between the air line and the second chamber is maintained by means of a restricted orifice and passage, including a venturi passage, whereby a negative pressure is developed in the second chamber proportional to the air flow past the venturi passage. The valve is connected, via a valve rod, to the diaphragm and to an external latching mechanism. As the rate of air flow through the line increases, an increasing force is transmitted by the valve rod to the external latching mechanism so that, at a predetermined setting, the latching mechanism unlatches and closes the valve. The invention further comprises a variable bias force acting on the latching mechanism and which is proportional to the air pressure within the air line. This variable bias mechanism compensates for increasing air line pressures, and provides a means for controlling the unlatching force required to close the valve as a function of air line pressure. This feature enables the valve to be usable in systems operating at a wide range of air pressure settings by merely adjusting the variable latching bias force.

BRIEF DESCRIPTION OF THE DRAWING

A preferred embodiment of the present invention is shown in the attached drawings, in which.

DESCRIPTION OF THE PREFERRED EMBODIMENT

Figure 1:
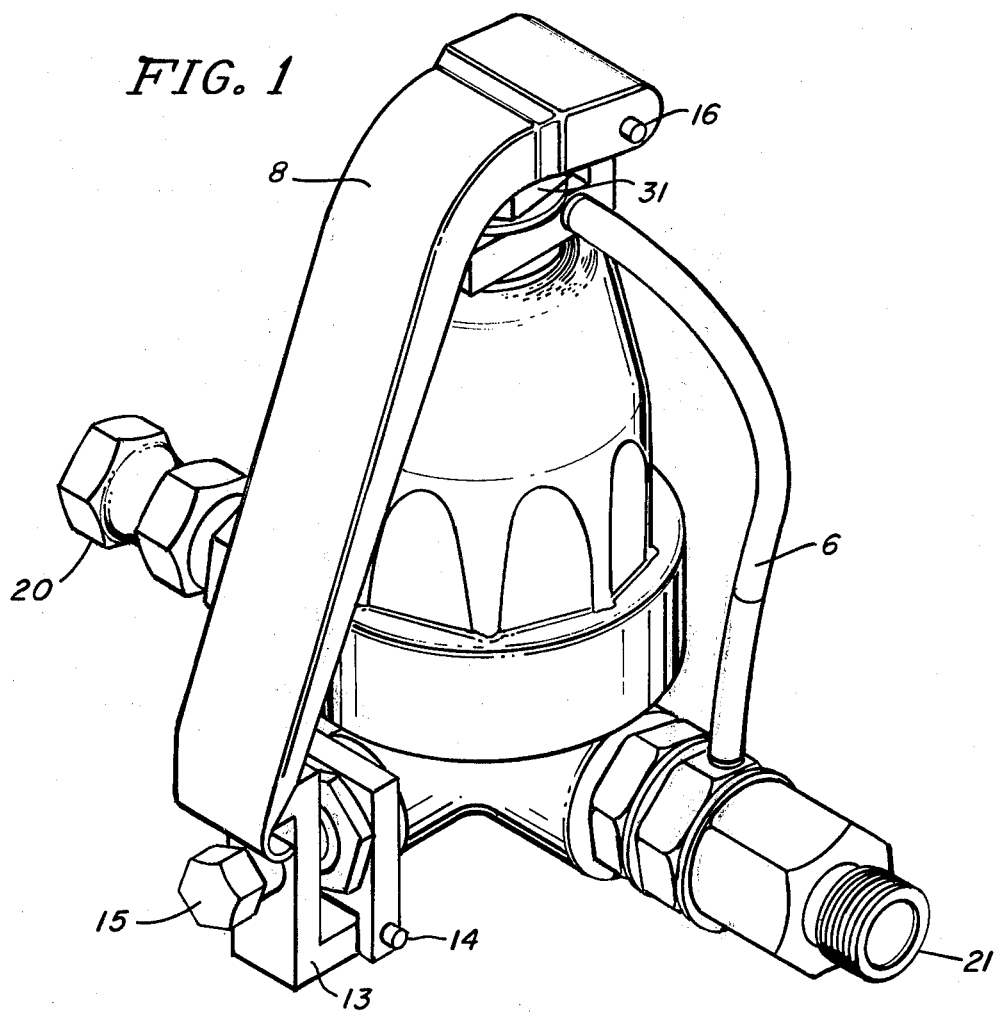
FIG. 1 is a side perspective view of the apparatus of this invention.

FIG. 1 illustrates a preferred embodiment of the invention in perspective side view. A threaded inlet connection 20 is connected to a suitable connector in a pressurized air line. A threaded outlet connection 21 is likewise connected to a suitable connector in the pressurized air line. Pressurized air flows through the apparatus in a manner to be hereinafter described, and the apparatus acts as a safety shut-off whenever the volumetric flow rate of the air passing through the apparatus exceeds a predetermined maximum. At the maximum setting, latch arm 8 becomes unlatched from detent 9, causing an internal valve to close and block the air passage. An adjustable member 15 provides a means for presetting the detent force of detent 9 acting upon latch arm 8, and thereby controls the desired volumetric air flow rate setting for unlatching latch arm 8. Latch arm 8 is pivotable about pin 16, which passes through the latch arm and a portion of the valve apparatus body. Once the valve has become unlatched to block air flow through the pressurized air line, it must be manually reset by forcing latch arm 8 over detent 9. This resetting action opens the internal valve and unblocks the air line passage for further normal operation.

Figure 2:
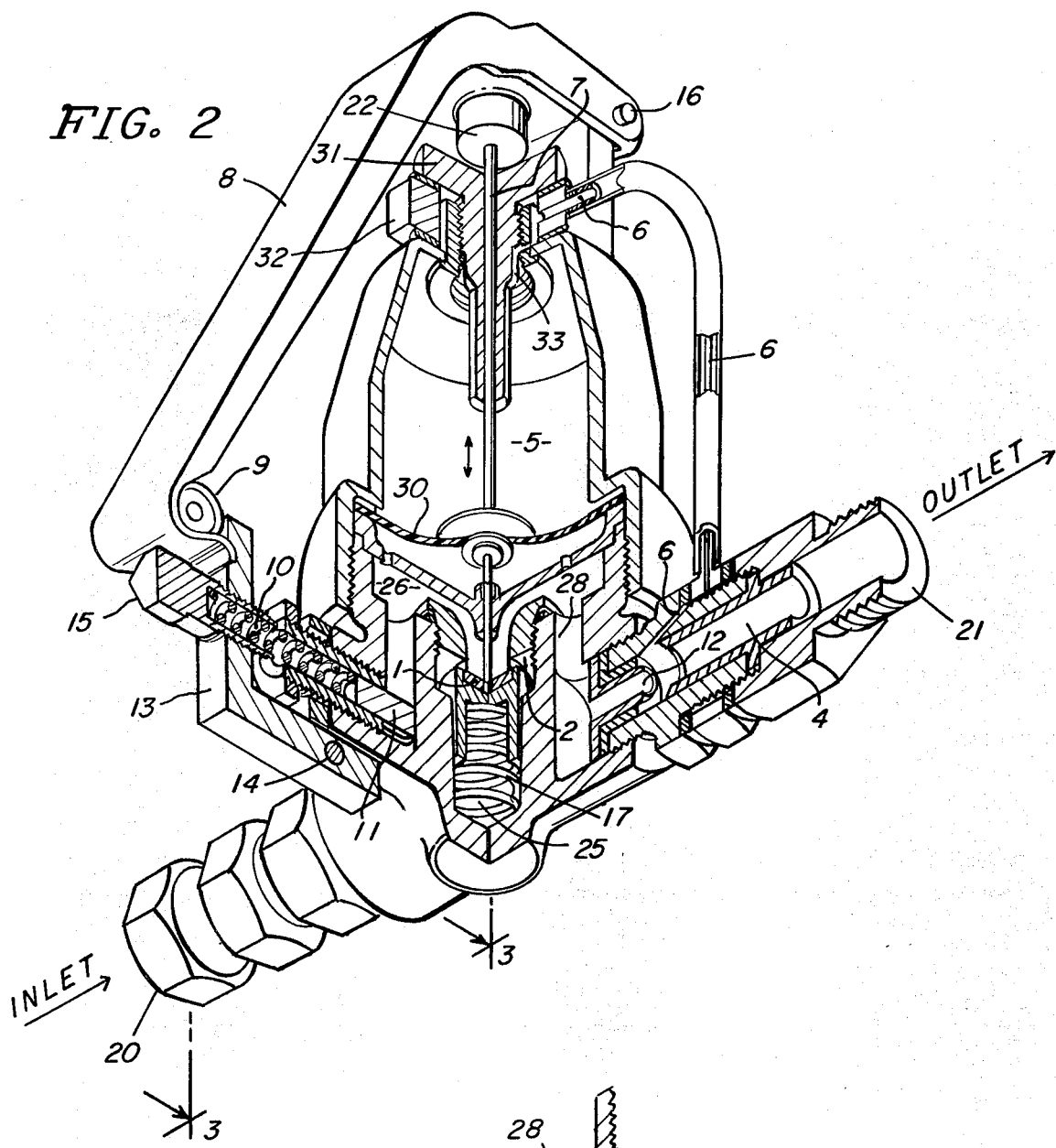
FIG. 2 is a perspective view in partial cross section showing the invention.

FIG. 2 shows the apparatus in partial cross section, to illustrate the novel internal features of the invention. Pressurized air enters the apparatus via inlet 20 and passes into a first chamber lower portion 25. When valve 1 is in its open position, the air passes around valve 1 into first chamber upper portion 26. Upper portion 26 is bounded along its upper side by diaphragm 30. From first chamber upper portion 26, pressurized air flows through passage 28, passage 4, and out through outlet 21. The flow rate of air through passage 4 is sensed by venturi 12, which is coupled via venturi passage 6 to second chamber 5. The flow rate of air past venturi 12 creates a negative pressure in second chamber 5, relative to the air pressure found in first chamber upper portion 26. This negative pressure is applied against the upper surface of diaphragm 30, and in opposition to the air pressure on the lower surface of diaphragm 30. There results a net upward force on diaphragm 30 which is proportional to the negative pressure developed in second chamber 5.

Valve rod 7 extends vertically through the valve body and connects the center of diaphragm 30 to valve 1. Thus, an upward deflection of diaphragm 30 tends to move valve 1 toward a closing position against its seat 2. However, valve rod 7 also extends through the upper wall of the apparatus and abuts against pad 22 which forms a part of latch arm 8. Therefore, when latch arm 8 is latched against dentent 9, pad 22 holds valve rod 7 from moving upward and thereby holds valve 1 in an open relationship to its valve seat 2.

Compression spring 17 provides a further upward bias against valve 1. Compression spring 17 is positioned between the apparatus body and the underside of valve 1 to bias it in the upward direction. As the rate of air flow through the apparatus increases, the combined upward force of spring 17 and the force on diaphragm 30 eventually exceed the detent 9 holding force and causes latch arm 8 to become unlatched from detent 9. When this occurs valve rod 7 moves sharply upward, closing valve 1 against seat 2 and blocking further air flow through the apparatus.

Valve rod 7 is slideable through air cap 31, but is dimensioned to provide a good air sealing fit within air cap 31. A suitable packing member may be used to further improve the sealing relationship between valve rod 7 and cap 31. Cap 31 has an internal communication passage 33 opening into second chamber 5, and also opening in communication with passage 6. Passage 6 is coupled into and through a collar 32 which is sealable clamped between cap 31 and the apparatus body. Collar 32 has an oversized internal diameter to allow for air flow between passage 6 and cap 31 passage 33.

Detent 9 is mounted on one end of L-shaped arm 13, the other end of which is pivotally attached via pin 14 to the apparatus body. Therefore, when detent 9 is unlatched from latch arm 8, arm 13 pivots downwardly a short distance to prevent relatching between detent 9 and latch arm 8. It becomes necessary to manually relatch detent 9 by lifting arm 13 and pushing latch arm 8 over the detent.

It can be seen that the upward force of valve rod 7, acting upon pad 22, tends to cause latch arm 8 to pivot about pin 16. This creates an upward and outward force to unlatch latch arm 8 from holding contact with detent 9. Acting in opposition to this force are a number of forces which combine to tend to hold detent 9 in latching connection with latch arm 8. A compression spring 10 pushes outwardly against pressure adjustment 15 to hold arm 13, and detent 9, in latching contact with latch arm 8. The inner end of compression spring 10 abuts against piston 11. Piston 11 is responsive to the pressure developed in first chamber upper portion 26 to transmit a further outward force against compression spring 10. Therefore, the greater the internal valve absolute pressure, the greater will be the force of piston 11 acting in combination with compression spring 10 to hold detent 9 in latching arrangement with latch arm 8. This force compensates for the non-linear build up of negative pressure in second chamber 5 with increasing valve pressures. In other words, at a given volumetric air flow rate through the apparatus, the negative pressure developed in second chamber 5 increases as the absolute pressure increases. This tends to create an upward force on pad 22 via valve rod 7 which is disproportionate to the volumetric flow rate through the apparatus, and more dependent upon absolute internal air pressure. The operative effect of compression spring 10 and piston 11 compensates for this disproportionate negative pressure by also increasing the detent force tending to hold latch arm 8 in latching contact with detent 9 as the absolute internal air pressure increases. The net effect of these compensating forces is to provide an apparatus which is responsive only to changes in volumetric air flow rate through the apparatus.

Figure 3:
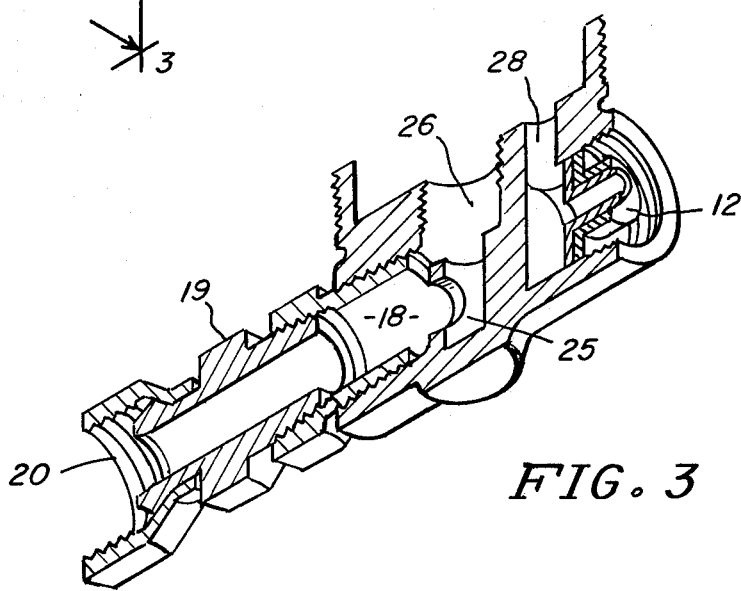
FIG. 3 is a cross section of the portion 3—3 illustrated in FIG. 2.

FIG. 3 illustrates the internal passages of the apparatus. Air inlet 20 is threaded to the apparatus by means of a coupler 19. Air flow into inlet 20 passes through passage 18 into first chamber lower portion 25. The air then passes into first chamber upper portion 26 (valve 1 and its associated assembly is not shown in FIG. 3). The air outlet passage from first chamber upper portion 26 is passage 28, which leads to the venturi 12. The air passing through venturi 12 creates a negative air pressure in a region downstream and surrounding the outlet of venturi 12, a phenomenon which is well known and understood in the art. This negative air pressure is sensed by venturi passage 6 (FIG. 2) which is in communication with second chamber 5 as hereinbefore described.

The preferred embodiment of the invention herein described therefore provides an apparatus for closing an air passage in response to a volumetric air flow rate which exceeds predetermined and preselected maximums. The invention is particularly adaptable for use in connection with air motor reciprocating devices which, under certain conditions, may reciprocate at a rate harmful to their structure. As their rate of reciprocation increases the volumetric air flow which they demand and expend in supporting the higher rate of reciprocation also increases. When this volumetric air flow rate exceeds the rate preselected for the present invention, the invention will unlatch and close the air passage in the manner that has been described herein. This shuts off the air supply to the reciprocating air motor and forces it to cease operation. Thus, an air motor which might otherwise be damaged or destroyed through excessive speed of operation is preserved and protected by the present invention.

The cross-sectional area of passage 6 may be varied to provide a control over valve responsiveness to sudden or transient pressure changes which sometimes occur when the valve is used in conjunction with typical commercial air motors. For example, when an air motor transitions from one stroke displacement to another it frequently requires an air surge in the supply lines to provide the changeover air pressure. The present invention can be made insensitive to these pressure surges while still providing its primary function of protecting against excessively high volumetric flow rates by constricting the size of passage 6. This has the effect of causing a time delay before a pressure change will unlatch the valve, and will therefore permit transient pressure changes to occur without unlatching the valve.

An alternative embodiment of the invention could be constructed wherein a variable orifice was connected into passage 6 to provide a variable control over the transient pressure changes to which the valve will remain insensitive. This variable orifice could take the form of a simple needle valve assembly, and would serve as a pressure sensitivity control.

What is claimed is:

1. Apparatus for limiting volumetric flow rate in a gaseous pressurized line, comprising:
   a. a valve body having an inlet and outlet connection for sealably connecting to the gaseous pressurized line;
   b. a first chamber in said valve body in communication with said inlet and having a pressure responsive diaphragm defining at least a portion of its chamber wall;
   c. a venturi passage having an inlet in communication with said first chamber and an outlet in communication with said valve body outlet connection;
   d. a second chamber in said valve body having said pressure responsive diaphragm separating it from said first chamber;
   e. passage means for connecting the region near said venturi passage outlet with said second chamber;
   f. a valve interposed in said first chamber in gas flow opening and closing position, said valve having a connection to said pressure responsive diaphragm;
   g. a mechanical latch connected to said valve body and having a latch-opening valve rod connected to said pressure responsive diaphragm, said latch further having a detent means for exerting a latch-holding force in opposition to force of said diaphragm on said latch-opening valve rod; whereby an unbalance of forces against said latch wherein said diaphragm force exceeds said latch-holding force of said detent means causes said valve to close; and
   h. pressure responsive force means, connected between said first chamber and said detent means, for increasing said detent means latch-holding force in relation to increasing pressure in said first chamber.

2. The apparatus of claim 1 wherein said mechanical latch further comprises a lever having a first end pivotally connected to said valve body, and having a second end in engagement with said detent means.

3. The apparatus of claim 2 wherein said pressure responsive force means further comprises a piston slideable in a passage communicating with said first chamber and a spring for biasing said piston toward said chamber.

4. The apparatus of claim 3 wherein said spring is positioned between said detent means and said piston, and further comprising threaded adjustment means for compressing said spring a predetermined amount.

5. The apparatus of claim 4 wherein said valve is located in said first chamber.

* * * * *